(12) United States Patent
Ladstaetter

(10) Patent No.: US 7,736,018 B2
(45) Date of Patent: Jun. 15, 2010

(54) LUMINAIRE WITH MAIN AND ACCENT LIGHT SOURCES

(75) Inventor: Gerald Ladstaetter, Klaus (AT)

(73) Assignee: Zumtobel Lighting GmbH, Dornbim (AT)

( * ) Notice: Subject to any disclaimer, the term of this patent is extended or adjusted under 35 U.S.C. 154(b) by 179 days.

(21) Appl. No.: 11/917,337

(22) PCT Filed: May 8, 2006

(86) PCT No.: PCT/EP2006/004288

§ 371 (c)(1),
(2), (4) Date: Dec. 12, 2007

(87) PCT Pub. No.: WO2006/133771

PCT Pub. Date: Dec. 21, 2006

(65) Prior Publication Data

US 2008/0273323 A1  Nov. 6, 2008

(30) Foreign Application Priority Data

Jun. 13, 2005  (DE)  ........................ 10 2005 027 261

(51) Int. Cl.
*F21V 8/00* (2006.01)
*F21S 8/04* (2006.01)

(52) U.S. Cl. .................. 362/240; 362/244; 362/246

(58) Field of Classification Search .............. 362/68, 362/612, 613, 228, 249.06, 231, 237, 240, 362/244, 246, 249.02

See application file for complete search history.

(56) References Cited

U.S. PATENT DOCUMENTS

| | | | | |
|---|---|---|---|---|
| 2,345,235 A | * | 3/1944 | Carter, Jr. ................. | 362/140 |
| 2,538,681 A | * | 1/1951 | Gangbin .................... | 362/216 |
| 3,287,551 A | * | 11/1966 | Vin Dick ................... | 362/216 |
| 4,223,374 A | * | 9/1980 | Kimmel .................... | 362/556 |
| 6,161,939 A | * | 12/2000 | Bansbach .................. | 362/223 |
| 6,234,643 B1 | * | 5/2001 | Lichon, Jr. ................ | 362/147 |
| 6,296,372 B1 | * | 10/2001 | Rhomberg ................. | 362/225 |
| 6,508,576 B2 | * | 1/2003 | Emmelmann et al. ...... | 362/543 |
| 6,705,742 B1 | * | 3/2004 | Patterson et al. ........... | 362/224 |
| 6,789,914 B1 | * | 9/2004 | Brown et al. .............. | 362/147 |
| 6,945,668 B1 | * | 9/2005 | Orlov et al. ............... | 362/225 |
| 2002/0126478 A1 | | 9/2002 | Cornelissen et al. | |
| 2005/0105302 A1 | * | 5/2005 | Hofmann et al. .......... | 362/555 |

(Continued)

FOREIGN PATENT DOCUMENTS

DE  102 16 645  11/2003

(Continued)

OTHER PUBLICATIONS

International Search Report for PCT/EP2006/004288 dated Jun. 9, 2006.

*Primary Examiner*—Ismael Negron
(74) *Attorney, Agent, or Firm*—Marshall, Gerstein & Borun LLP

(57) ABSTRACT

A luminaire contains a main light source the light of which is emitted by the luminaire, and an additional light source the light of which is mixed with the light of the main light source before the emission thereof. A part of the light issued by the additional light source is, with respect to the light emitted by the main light source, issued by the luminaire housing directed to the side or to the rear side.

19 Claims, 4 Drawing Sheets

U.S. PATENT DOCUMENTS

2006/0023447 A1   2/2006   Justel et al.
2008/0259596 A1*  10/2008  Biebl et al. ................. 362/228

FOREIGN PATENT DOCUMENTS

| JP | 54131365 | 10/1979 |
| WO | WO-2004/036618 | 4/2004 |
| WO | WO-2004/055428 | 7/2004 |

* cited by examiner

LUMINAIRE WITH MAIN AND ACCENT LIGHT SOURCES

BACKGROUND OF THE INVENTION

1. Field of the Invention

The present invention relates to a luminaire which has a main light source, the light of which is emitted from the luminaire, and an additional light source, the light of which is mixed with the light of the main light source before it is emitted.

2. Related Technology

A luminaire of the kind concerned is known for example from DE 102 16 645 A1. The use of the different light sources serves here the purpose of influencing the spectral composition of the light issued by the luminaire. Hereby, it is provided that the main light source issues white light to which then the colored light of the additional light source(s) is mixed. The additional light sources are preferably formed by LEDs, with the aid of which thus a desired color toning is obtained for the light used for illumination.

Through the use of different light sources, thus attractive lighting-technical effects can be obtained. The problem can, however, appear with the known luminaires which are based on the principle described above that the color component brought about by the additional light source is perceived only insufficiently. This problem area arises in particular when the difference between the luminous flux produced by the main light source and the luminous flux of the additional light source(s) is very great.

GENERAL DESCRIPTION OF THE INVENTION

The present invention further develops known luminaires of the of the kind concerned, that the color effect brought about by the additional light source can be consciously perceived or better perceived.

Accordingly, the invention provides a luminaire having a main light source the light of which is emitted by the luminaire, and an additional light source the light of which is mixed with the light of the main light source before the emission thereof, characterized in that, a part of the light issued by the additional light source is, with respect to the light emitted by the main light source, issued by the luminaire housing directed to the side or to the rear side.

The present invention in based in turn on the concept of using two light sources, a main light source and an additional light source, wherein a first task of the additional light source consists in lending a color component to the light emitted by the main light source. In accordance with the invention it is now, however, provided that this color component is additionally accentuated in that a part of the light issued by the additional light source is, with respect to the light emitted by the main light source, issued by the luminaire housing directed to the side or to the rear side.

In accordance with the invention there is thus proposed a luminaire with a main light source the light of which is emitted by the luminaire, and an additional light source the light of which is mixed with the light of the main light source before the emission thereof, wherein a part of the light issued by the additional light source is issued, with respect to the light emitted by the main light source, by the luminaire housing directed to the side or to the rear side.

In accordance with the present invention correspondingly the light of the additional light source is additionally used at least partly to bound or border the emitted light of the main light source or a region illuminated by the main light source, wherein this bordering with light is effected in a color which, by reason of the mixing in of the light of the additional light source to the light of the main light source, also corresponds to the color character of the light provided for room illumination. The light used for the bordering is, however, considerably more intensive in color so that in this way an accentuation of the color toning is effected. Through this there arise particularly pleasant illumination situations, which for an observer or for a person situated within the illuminated region work visually very attractively.

The concept of slightly coloring the light provided for general illumination is component of the so-called Active Light strategy with which the general light is slightly changed in color, time-dependently, to simulate the usual course of daylight. Thereby, the light color is changed only relatively weakly over a very long time period, which for the person is scarcely visible or perceptible. Despite this, this slight color influencing of the light for general illumination has the consequence that the personal sense of well-being increases, since also in rooms which are mainly or exclusively illuminated by artificial light, there is brought about the impression of natural illumination. This effect can also be used with the luminaire in accordance with the invention, whereby however the slight color shift of the general illumination is now optically strengthened. Thus, a for example slight reduction in the color temperature of the general illumination can be strengthened with the luminaire in accordance with the invention by means of a optically well visible blue toning of the accenting illumination, whereby this effect is obtained for the first time with the aid of one single luminaire.

To obtain the mentioned lighting-technical effects in accordance with the invention, the luminaire can be configured in different manners.

Thus, it is preferably provided that for mixing the light of the two light sources there is put to use a mixing device which is formed for example by a transparent light guide element, into which there is emitted on the one hand the light issued by the main light source and on the other hand a part of the light issued by the additional light source. The light guide element preferably has further a light emission surface via which the coupled in light of the two light sources is issued as common mixed light. A further transparent light emission plate can then be arranged downstream of the light guide element, via which the mixed light formed by the light guide element is emitted from the luminaire. If this mixed light is to be emitted in certain angular ranges such that dazzling effects are avoided as far as possible, then the light emission plate can have for example a microprism structure. Also the use of luminaire rasters or the like would be conceivable, to form the light provided for general illumination dazzle-free.

The light guide element for mixing the two light components is preferably configured in the form of a plate, whereby the light of one of the two light sources is coupled in via a flat side lying opposite the light emission surface, and the light of the other light source is coupled into the light guide element via an end side. Seen in light emission direction there may further be arranged in front of the light guide element a transparent second light guide element into which the light of one of the two light sources is radiated in at the side, wherein this light is then issued via a surface towards the flat side of the light guide element and in this way is radiated into the light guide element. Here, there is preferably involved the light of the main light source, since in this way it is attained that this light is issued as uniformly as possible over the entire light emission surface of the luminaire.

For attaining the accenting illumination in accordance with the invention there can be associated with the additional light source for example a further light conducting element, via which a part of the light issued by the additional light source is directed, with respect to the general light emitted by the luminaire, to the side, in particular obliquely rearwardly, onto a wall or ceiling to which the luminaire is to be fastened. This light conducting element, with the aid of which the color accented bordering of the light emission surface of the luminaire is attained, can for example be arranged in a lateral opening of the luminaire housing.

As an alternative to the use of the light conducting element for the realization of the accenting illumination, for example a reflector could, however, also be provided, via which a part of the light issued by the additional light source is emitted to the side via an opening of the luminaire housing.

The additional light source is—as mentioned already—preferably formed by a plurality of LEDs, which issue a colored light. Here it would in particular also be conceivable to use different colored LEDs in order to attain, by a corresponding control of these individual LEDs, a desired mixed color tone. The main light source for the general illumination is preferably formed by at least one gas discharge lamp, in particular a fluorescent lamp.

BRIEF DESCRIPTION OF THE DRAWINGS

Below, the invention will be explained in more detail with reference to the accompanying drawings. There is shown.

DETAILED DESCRIPTION

Figure 1:
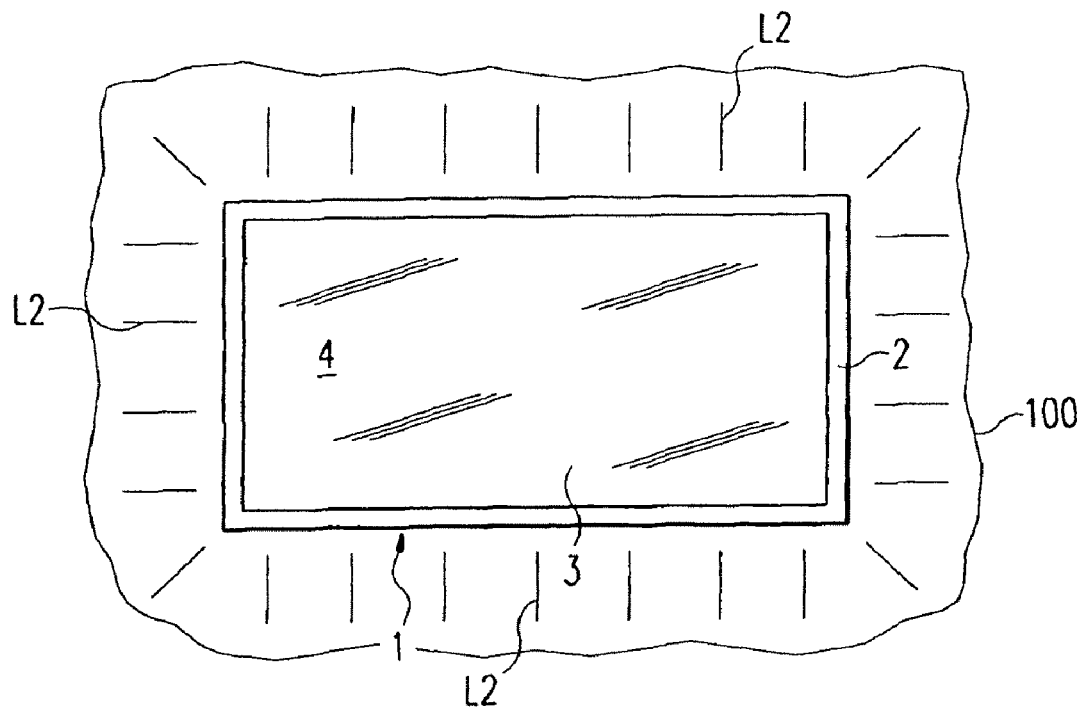
FIG. 1 shows the front view of a luminaire in accordance with the invention, fastened to a wall or ceiling.

Before concrete embodiments for the configuration of the luminaire in accordance with the invention are explained with reference to FIGS. 3 and 4, firstly with reference to FIGS. 1 and 2 the general configuration of the luminaire will be discussed with regard to the thus obtainable lighting-technical effects. Here it will be assumed that the luminaire generally provided with the reference sign 1 is arranged on a ceiling 100 of a room to be illuminated. It would of course also be conceivable, however, to arrange the luminaire 1 on a wall; that is, vertically directed.

The luminaire 1 in accordance with the invention has firstly a luminaire housing 2 within which there are arranged the individual components, described in more detail below, for obtaining the lighting-technical effects. At the same time, the luminaire housing 2 delimits a light exit opening 3 located at its underside, via which the light provided for the illumination of a room in which the luminaire is arranged, which light is also described as general light in the following, is to be emitted. In the illustrated embodiment there is arranged within this light exit opening 3 a transparent light emission plate 4, via which the light emission is effected. Depending on whether the light provided for general illumination is to be emitted diffusely or directionally, this light emission plate 4 can be constituted for light scattering or have for example a microprism structure through which the emitted light is issued solely within determined angular ranges. In the case that a directional light emission is desired there could further also be provided the use of a luminaire raster or a comparable light directing element. In this case the light emission plate 4 could, if appropriate, also be omitted.

Within the luminaire housing 2 there are arranged two different kinds of light sources (not illustrated in FIGS. 1 and 2), a first light source, the so-called main light source, and a second light source which is described as an additional light source. It is the task of the main light source to provide the main part of the light provided for room or general illumination. Thus, the light of this main light source is issued via the light exit opening 3 of the luminaire housing 2. It is the task of the accenting or additional light source firstly to slightly color the light provided for the room or general illumination. For this it is provided that the light issued by the additional light source is mixed with the light of the main light source to a certain proportion. The light provided with the reference sign L1 and provided for general illumination correspondingly does not consist only of the light of the main light source but instead represents a mixed light which is made up of the light of both light sources. Since the main light source will normally issue white light, thus with the aid of the additional light source a certain color nuance is lent to the general light.

Since the luminous flux of the main light source is, however, as a rule considerably higher than that of the additional light source, the case can arise that the coloring of the general light is initially scarcely perceptible. This effect is, however, now stressed or emphasized in that the luminaire housing is at the same time surrounded by an accenting light 2 which is considerably stronger in color and correspondingly is better perceptible.

Figure 2:
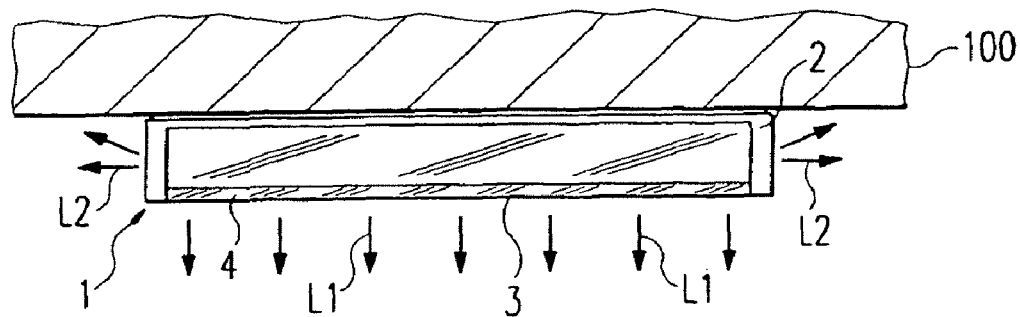
FIG. 2 shows a schematic sectional view of the luminaire in accordance with the invention.

Corresponding to the illustration in FIGS. 1 and 2, the light L2 of the additional light source is correspondingly in addition emitted also to the side, in particular directed obliquely upwardly to the side, to brighten the surrounding ceiling region. In this way an indirect illumination is obtained, whereby, however, this is not to be used for room illumination. Instead, merely an accentuation of the luminaire 1 is to be attained; that is, a slight colored edge is brought about at the surrounding ceiling region which has the same color tone as the general light, but is however considerably more intensive and correspondingly better perceptible. In this way a particular lighting-technical effect is attained which lends an interesting appearance to the luminaire 1 and at the same time appears visually attractive for an observer. The accenting light L2 can thereby—as illustrated—completely border the luminaire housing; it would however also be conceivable that this light is issued merely to certain sides, for example to bring about an accentuation at two end walls facing each other.

Figure 3:
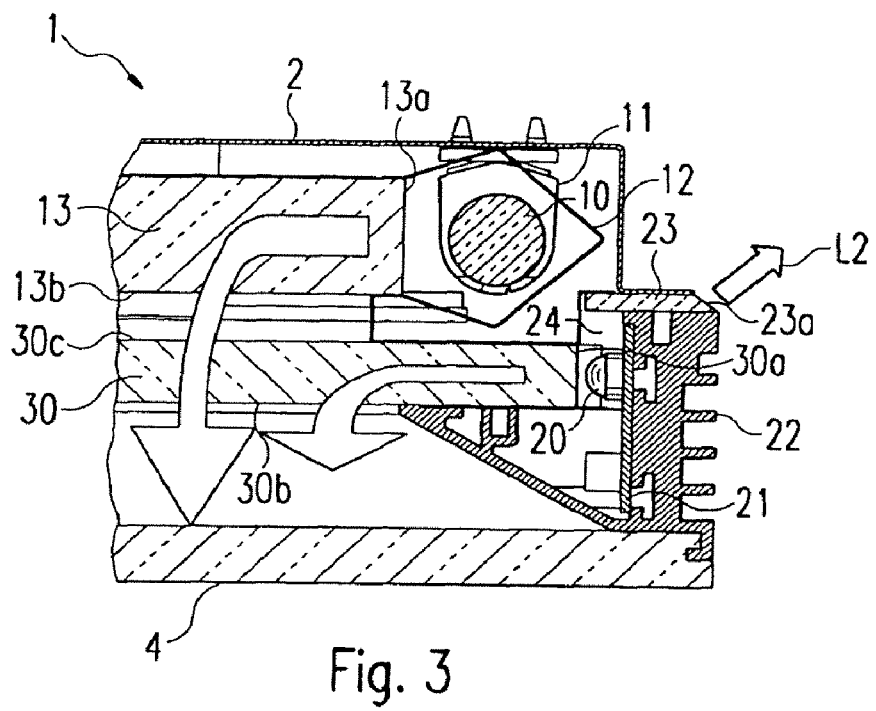
FIG. 3 shows a first variant for the configuration of the luminaire for the realization of the accenting illumination.

A first possibility for the configuration of the luminaire 1 to obtain the lighting-technical effects in accordance with the invention is now illustrated in FIG. 3. This sectional view of a side region of the luminaire 1 shows that there are arranged within the luminaire housing 2 a main light source 10 in the form of a gas-discharge lamp, in particular a fluorescent lamp, and an additional light source 20 in the form of a plurality of LEDs. Thereby, the light source 10 is held in the housing 2 by means of a fitting 11, wherein the fitting 11 is latched to the floor side of the housing 2. In turn the LEDs of the additional light source 20 are fastened on a mounting rail 21 which is arranged on a profile part 22 which towards the front side closes the luminaire housing 2 and forms the mounting for the various optical elements of the luminaire 1. It is to be noted that the luminaire 1 is preferably configured symmetrically and correspondingly fluorescent lamps or LEDs are arranged to the two sides of the optical elements—still to be described—as main light sources and additional light sources.

A significant element of the luminaire 1 in accordance with the invention, for obtaining the lighting-technical effects explained above, is a mixing device which is formed in the illustrated embodiment by a transparent light guide element 30. This light guide element 30 is configured in particular plate-form and serves to mix the light of both light sources 10 and 20 with each other, which is attained in that the light of both light sources 10, 20 is coupled into the light guide element 30 and issued again in common as a mixed light. The coupling-in of the light of the LEDs 20 is effected via an end side 30a of the light guide element 30 while in contrast the light of the fluorescent lamp 10 is coupled in via the flat side 30c lying opposite to the light exit surface 30b.

To ensure that the issue of light is as uniform as possible over the entire light emission surface of the luminaire 1, measures must be taken through which it is ensured that the light of the main light source 10 is emitted into the light guide element 30 as uniformly as possible. For this reason there is provided in front of the mixing device a second light guide element 13 in form of a further transparent plate into which there is coupled, in turn to the side, from an end side 13a, the light of the fluorescent lamp 10, and coupled out via the flat side 13b towards the flat side 30c of the light guide element 30. Such transparent light guide elements for the extensive uniform issue of light coupled in from the side are already well known from the state of the art and correspondingly need not be described in more detail. The advantage of these elements consists in that the light coupled in at the side is so deflected that it again leaves the element with a homogeneous light intensity distribution. The light of the additional light source 20 coupled in by the light guide element or the light guide element 30 then so acts in combination with the light of the main light source 10 that well intermixed mixed light, which does not have any color shadows, is incident in a region illuminated by the luminaire in accordance with the invention. In order as far as possible to be able to use the complete light of the fluorescent lamp 10, it is provided that this is surrounded by one of the reflectors 12 which at an end face adjoins the second light guide element 13.

As indicated by the two arrows, thus the light of the two light sources, the main light source 10 and the additional light source 20, are coupled into the mixing device 30 by means of which then both light components are issued jointly and finally emitted via the light emission plate 4 of the luminaire 2. The light formed hereby for the general illumination consists therefore in substance of the white light of the fluorescent lamp 10, but is however provided with a slight color nuance, which is brought about by the LEDs 20.

The color toning, hardly perceptible in the light for the general illumination, is now optically made visible in that a part of the light issued by the LED 20 is not coupled into the mixing device 30 but instead issued obliquely to the side rearwardly. For this a further light guide 23 is provided which is associated with the LEDs 20 and so arranged in an opening of the housing 2 or in an intermediate space between the housing 2 and the profile part 22 that the light from the LEDs 20 coupled into this light guide 23 is directed out of the luminaire housing 2 at the side. To ensure that this light brightens the surrounding ceiling region, on which the luminaire 1 is mounted, the light guide 23 has at its end a bevel 23a which refracts the light in a suitable manner and deflects it correspondingly to the rear side.

Figure 3A:
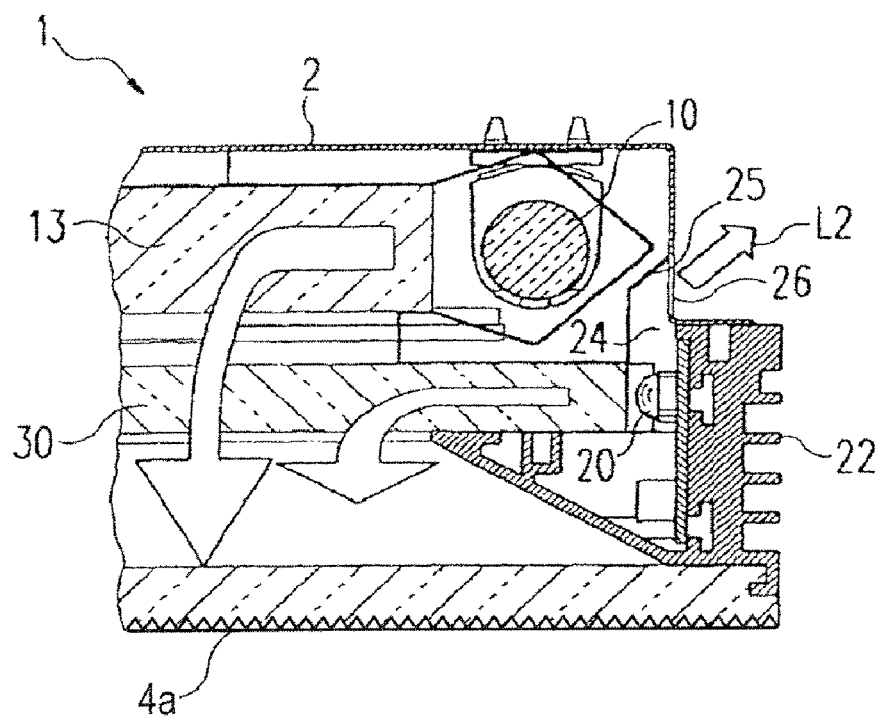
FIG. 3a shows a variant of the luminaire of FIG. 3 incorporating a microprism.

FIG. 3a illustrates the luminaire 1 of FIG. 3 wherein a light emission plate 4a incorporates a microprism structure.

Figure 3B:
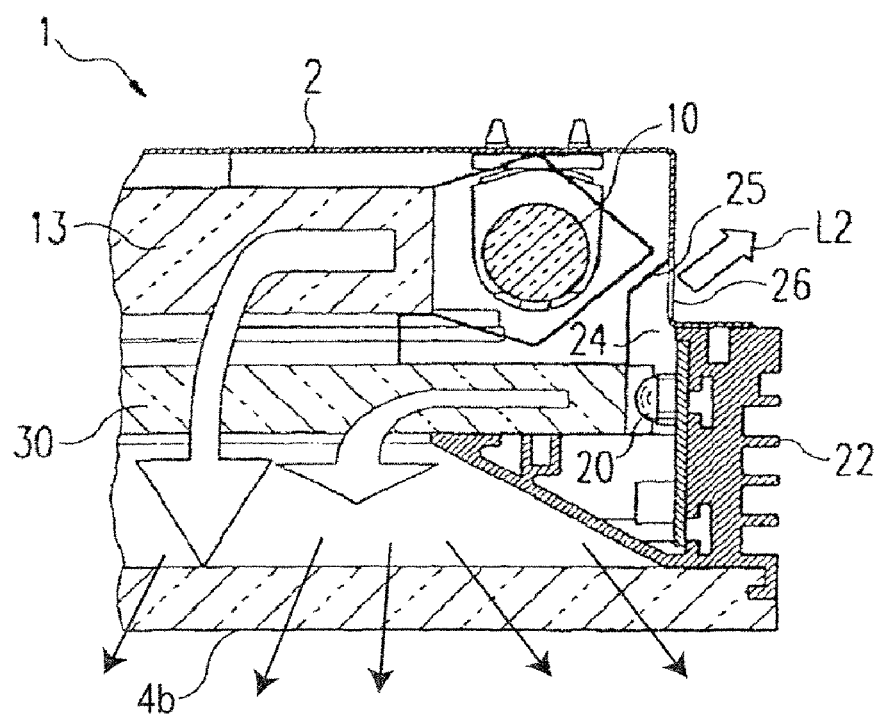
FIG. 3b shows the variant of FIG. 3 showing that without a raster or microprism, emitted combined light would be allowed to scatter.

FIG. 3b illustrates the luminaire 1 of FIG. 3 illustrating that, without modification of a light emission plate 4b, the emitted combined light would be allowed to scatter.

Figure 3C:
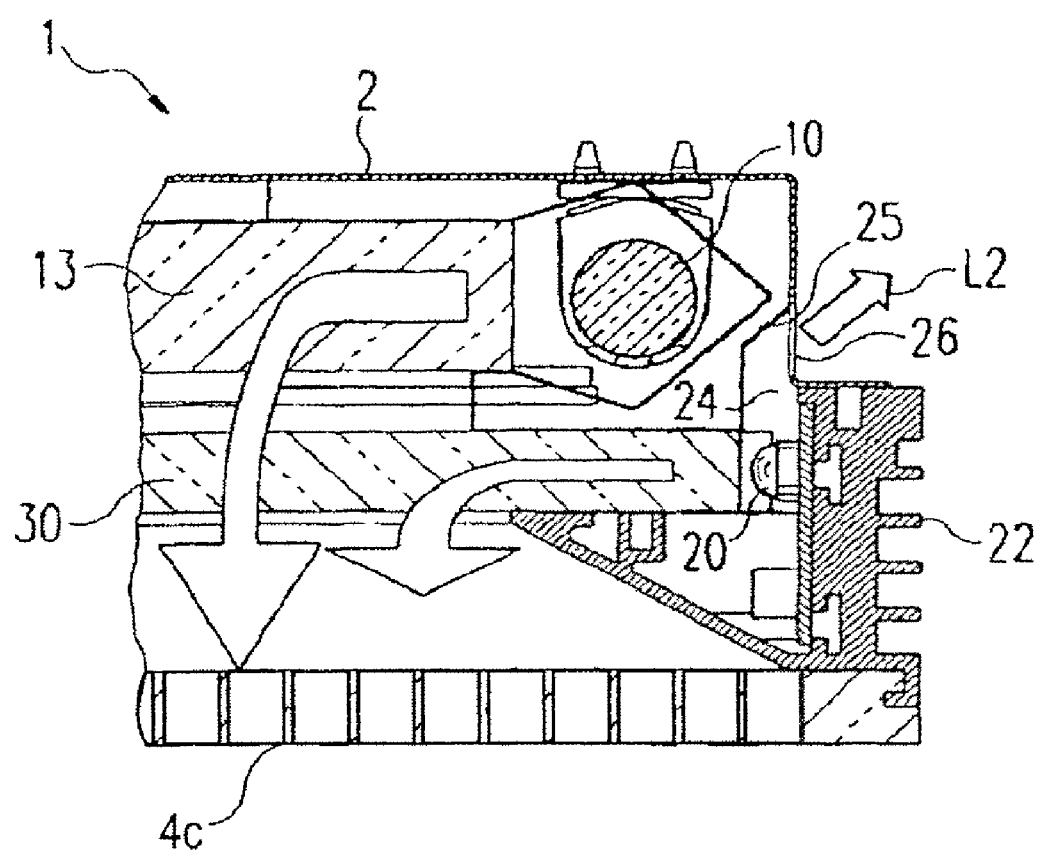
FIG. 3c shows a variant of the luminaire of FIG. 3 incorporating a raster.

FIG. 3c illustrates the luminaire 1 of FIG. 3 wherein a light emission plate 4c comprises a raster arrangement disposed downstream of the light guide element 30 whereby the mixed light is allowed to issue in a predetermined angular range.

Figure 4:
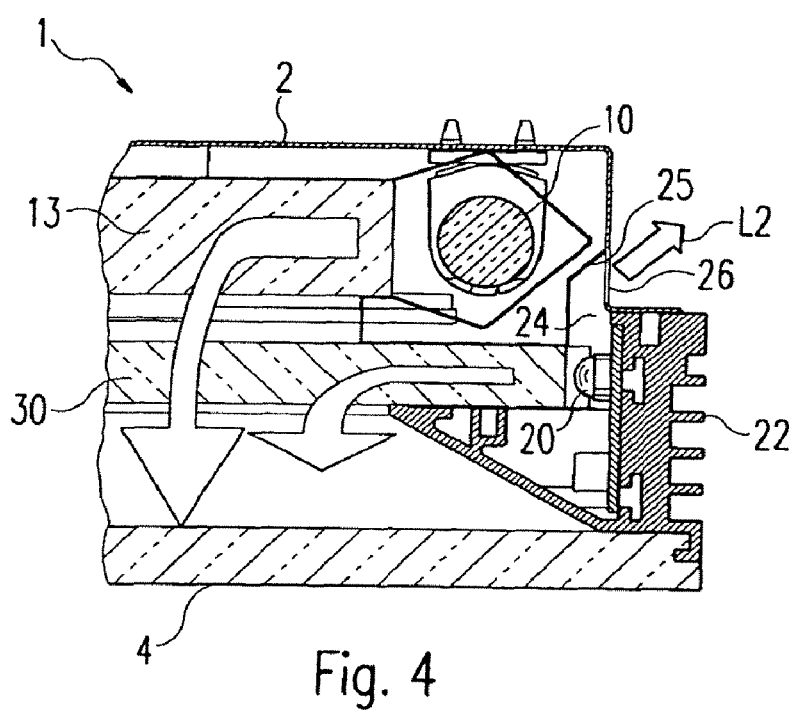
FIG. 4 a second variant for the possible configuration of the luminaire in accordance with the invention.

An alternative embodiment to the light guide 23 is illustrated in FIG. 4. In this case there is in turn provided above the LEDs 20 in the housing 2 an opening 26, wherein however, now a further reflector 25 is arranged near the LEDs 20, which is so configured that the light of the LEDs, which is incident on this reflector 25 via an upper clearance 24, is in turn emitted through the opening 26 obliquely upwardly to the side. The further components of the luminaire for attaining the mixed light for the general illumination correspond to the illustration in FIG. 3.

Thus, by means of the illustrated measures the particular lighting-technical effects can be attained, namely on the one hand the mixing of the two light components for general illumination and on the other hand coupling out, to the side, of the light of the additional light sources for indirect illumination. It is to be noted that also the use of a differently colored LEDs can be provided in order to influence the color toning for the accenting light or the color nuance of the general light in a desired manner. For example by means of suitable control of LEDs of the colors red, green and blue, an arbitrary color toning could be attained. Thereby it could then for example be provided that the color toning is slightly adapted in the course of the day to create the impression of a natural illumination.

Furthermore it is to be noted that instead of the illustrated light guide element for attaining the mixed light for general illumination, also other measures for light mixing can be provided. The embodiment illustrated in the Figures has however proved to be advantageous, since through this a particularly uniform emission of the mixed light can be attained. As alternative to the indirect lighting it would be also further be conceivable to border the emission surface for the general lighting with a further emission surface, via which the light of the additional light source(s) is diffusely emitted.

Altogether, there is thus provided a luminaire by means of which particularly attractive visual effects can be attained. Through this the possibilities for application of the luminaire in accordance with the invention are considerably extended.

The invention claimed is:

1. Luminaire comprising:
a luminaire housing comprising a front, sides and a rear, at least one of the sides including a light transmissive portion;
a main light source, and
an additional light source,
wherein the main and additional light sources issue light from the luminaire housing front and at least part of the light issued from the main and additional light sources is mixed before being issued from the luminaire housing front, and a part of the light issued by the additional light source is issued by the luminaire housing through the light transmissive portion directed in a sideways or rearward direction, with respect to the light emitted by the main light source.

2. Luminaire according to claim 1, comprising, associated with the additional light source, a reflector via which a part of the light issued by the additional light source is emitted to the side via an opening of the luminaire housing.

3. Luminaire according to claim 2, wherein the reflector is configured such that the light issued to the side is directed onto a wall or ceiling to which the luminaire is to be fastened.

4. Luminaire according to claim 1, wherein the main light source is formed by at least one gas-discharge lamp.

5. Luminaire according to claim 4, wherein the gas-discharge lamp is a fluorescent lamp.

6. Luminaire according to claim 1, comprising a light conducting element associated with the additional light source, via which element a part of the light issued by the additional light source is issued, to the side with respect to the light emitted by the main light source.

7. Luminaire according to claim 6, wherein the light conducting element is disposed in a side opening of the luminaire housing.

8. Luminaire according to claim 6, wherein the light guide element or the reflector is configured such that the light issued to the side is directed onto a wall or ceiling to which the luminaire is to be fastened.

9. Luminaire according to claim 1, wherein the light issued by the additional light source is colored.

10. Luminaire according to claim 9, wherein the additional light source is formed by a plurality of LEDs.

11. Luminaire according to claim 10, wherein the additional light source is formed of a plurality of differently colored LEDs.

12. Luminaire according to claim 1, comprising a mixing device, by which the light issued by the additional light source is mixed with the light of the main light source.

13. Luminaire according to claim 12, wherein the mixing device is comprises a transparent light guide element into which the light issued by the main light source, and a part the of the light issued by the additional light source, is emitted, wherein the light guide element has a light emission surface via which the light coupled in by the two light sources is issued as mixed light.

14. Luminaire according to claim 13, comprising a further transparent light emission plate disposed downstream of the light guide element, via which the mixed light formed by the light guide element is issued from the luminaire.

15. Luminaire according to claim 13, wherein the light guide element is configured in the form of a plate, and wherein the light of one of the two light sources is coupled into the light guide element via a flat side lying opposite the light emission surface and the light of the other light source is coupled into the light guide element via an end side.

16. Luminaire according to claim 15, comprising, seen in a light emission direction, a transparent second light guide element disposed in front of the light guide element, into which the light of one of the two light sources is emitted at the side, wherein this light is issued over a surface facing the flat side of the second light guide element and is emitted into the light guide element.

17. Luminaire according to claim 13, comprising a raster arrangement disposed downstream of the light guide element for issue of the mixed light in a predetermined angular range.

18. Luminaire according to claim 14, wherein the light emission plate has a microprism structure.

19. Luminaire according to claim 14, wherein the light emission plate is configured to scatter light.

* * * * *